United States Patent [19]

Busacca

[11] 4,035,192
[45] July 12, 1977

[54] CEMENT AND AGGREGATE MIXTURE AND METHOD FOR MAKING SAME

[76] Inventor: Joseph P. Busacca, 946 E. 85th St., Brooklyn, N.Y. 11227

[21] Appl. No.: 604,544

[22] Filed: Aug. 14, 1975

[51] Int. Cl.$^2$ .......................................... C04B 7/35
[52] U.S. Cl. ............................... 106/90; 260/42.13
[58] Field of Search ............ 106/90, 97; 260/29.65, 260/29.75, 42.13

[56] References Cited

U.S. PATENT DOCUMENTS

| | | | |
|---|---|---|---|
| 1,409,091 | 3/1922 | Goddard | 106/97 |
| 3,503,771 | 3/1970 | Kroyer | 106/97 |

*Primary Examiner*—J. Poer
*Attorney, Agent, or Firm*—Kirschstein, Kirschstein, Ottinger & Frank

[57] ABSTRACT

A resilient material such as rubber is pulverized into particles. The particles are then coated with dry cement. In one embodiment of the invention the coating may be accomplished by heating the particles until their outer surfaces become viscid and the mixing the particles with cement so that when the cement contacts the viscid outer surfaces, it will adhere thereto, enveloping the particles with a layer of cement. In another embodiment, the cement may be heated and then brought into contact with the particles. The outer surfaces of the particles will become adhesive and the cement will adhere thereto. In a further embodiment, the particles may be coated with a plastic film. The plastic coated particles are then coated with cement as described. Alternatively the plastic coated particles may be mixed with the cement before the plastic has set. The cement will adhere to the still unset plastic coating. In each of the embodiments, the cement will be permanently bonded to the particles. The cement coated particles are then combined with additional cement to form a cement and aggregate mixture at a predetermined ratio of particles to cement.

When water is added to the cement and aggregate mixture in an amount sufficient to cause the cement to set or gel irreversibly, a light weight, resilient concrete is formed. Since the cement is bonded either directly to the particles or to the plastic coating surrounding the particles, it will not readily separate therefrom and the particles will become an integral part of the concrete which results in the concrete having physical properties different from ordinary concrete.

Where the particles are coated with plastic to aid in the adhesion of the cement to the particles, the plastic film further acts as a barrier to prevent fluid flowing over the concrete from contacting the particles and picking up impurities which would stain the concrete.

27 Claims, No Drawings

CEMENT AND AGGREGATE MIXTURE AND METHOD FOR MAKING SAME

BACKGROUND OF THE INVENTION

1. Field of the Invention

The invention relates to a construction material and a process for making the same, and in particular, a construction material wherein rubber particles having a cement coating bonded thereto are mixed with cement to form a cement and aggregate mixture which will produce a light weight concrete having a certain degree of resiliency.

2. Prior Art

There is a great need for finding uses for articles which have been discarded or have outlived their usefulness in the marketplace. In particular, there is a need for finding uses for waste rubber from articles such as rubber tires and similar products. Processes have been developed for reclaiming rubber in which the reclaimed rubber is used for the production of hard rubber products. One such process is that disclosed in U.S. Pat. No. 2,809,499.

Moreover, in the construction industry, there is a great demand for a light weight resilient concrete material. Presently, in light weight concrete exploded shale is used as a filler, however, because of the depleting supplies of shale, the cost of this filler is increasing, resulting in a corresponding rise in the cost of concrete. In addition, concrete and light weight concrete using shale as a filler are quite brittle.

In U.S. Pat. No. 2,263,914 there is disclosed a construction material utilizing pulverized rubber in the cement mixture to produce a material which is light weight and which has water proofing and insulating properties. Waste rubber, which can be in the form of a dust, is mixed with the cement. Water is then added to the mixture in an amount to cause the mixture to set. A water proofing agent and various fillers may be added to the rubber-cement mixture. One of the problems with this rubber cement mixture is that there is the possibility that no bond or little bond will develop between the rubber particles and the cement surrounding it after the mixture has set. Therefore, the concrete will now have sufficient strength or resiliency.

It is toward elimination of these and other problems that the present invention is directed.

SUMMARY OF THE INVENTION

1. Purpose of the Invention

It is an object of the present invention to provide a mixture of cement and cement coated rubber particles which, when mixed with water and allowed to set, produces a light weight resilient concrete which is capable of withstanding large variations in temperature.

Another object of the present invention is to provide a mixture of cement and cement coated rubber particles which, when mixed with water and allowed to set, produces a shock absorbant waterproof concrete.

Still another object of the present invention is to provide a mixture of cement and cement coated rubber particles which, when mixed with water and allowed to set, produces a concrete which has improved heat retention and electrical insulating qualities.

Yet another object of the present invention is to provide a mixture of cement and cement coated rubber particles which, when mixed with water and allowed to set, produces a concrete which is self healing.

Yet another object of the present invention is to provide a mixture of cement and cement coated rubber particles which, when mixed with water and allowed to set, produces a cement in which the rubber particles will not bleed.

A further object of the present invention is to provide a method for producing a cement and aggregate mixture which reclaims waste products having otherwise limited uses.

A still further object of the present invention is to provide a method for producing a mixture of cement and cement coated rubber particles which when mixed with water and subsequently set will result in a light weight resilient concrete possessing the attributes hereinabove set forth.

A yet further object of the present invention is to provide a method for producing a mixture of cement and cement coated rubber particles wherein the rubber particles are prevented from bleeding and staining the concrete.

Other objects of the invention in part will be obvious and in part will be apparent in the following description.

2. BRIEF DESCRIPTION OF THE INVENTION

Generally, the foregoing and other objects are achieved by pulverizing waste rubber and coating the particles with dry cement. The resiliency of the concrete is directly dependent upon the resiliency of the rubber particles. The waste rubber may be used as is without further treatment which results in a resilient concrete or may be re-vulcanized to a harder state which will result in the formation of a more rigid concrete. In one embodiment of the present invention the coating process involves heating the particles until their outer surface becomes viscid and then mixing the particles with cement. The cement will adhere to the viscid outer surfaces. In an alternative embodiment, the cement can be heated and the particles mixed with the heated cement. The surface of the particles will become viscid, and the cement will adhere thereto. In a further alternative embodiment the particles may be first coated with a thin film of plastic. Then the plastic coated particles are coated with cement either by heating methods described after the plastic has set or by mixing the coated particles with the cement before the plastic has set. The cement coated particles are then combined with additional cement to form a cement and aggregate mixture of a predetermined ratio of cement to rubber.

When water is added to the cement and aggregate mixture in an amount sufficient to cause the cement to set or gel irreversibly, an improved light weight resilient concrete is formed. Since the cement is permanently bonded to rubber particles, it will not separate therefrom as the concrete is forming so that the particles will become an integral part of the concrete. The concrete will therefore have physical properties different from ordinary concrete.

Not only does the plastic coating hereinabove mentioned aid in the adhesion of the cement to the particles, but it also acts as a barrier, to prevent fluid from coming in contact with the rubber so that the fluid cannot pick up impurities which would stain the concrete.

The invention consists in the material and series of steps which will be exemplified in the following description and of which the scope of application will be indicated in the appended claims.

PREFERRED EMBODIMENT OF THE INVENTION

A cement and aggregate mixture, which may be a Portland cement or another type of hydraulic cement and resilient particles is produced in accordance with the present invention by coating the resilient particles with a layer of the cement before they are mixed with the cement to form the mixture. Preferably, the resilient particles are formed from vulcanized natural or synthetic rubber which may be obtained from worn out or discarded articles such as rubber tires and similar products. The rubber particles are formed by comminuting or pulverizing the rubber articles to form particles comparable in size to the stone or sand aggregates currently being used. The particles may be between 20 to 60 mesh size. It will be appreciated that the particle size may be larger than the 60 mesh size and the process achieves satisfactory results when the rubber articles are shredded into long filaments.

The concrete formed from the cement and aggregate mixture described hereinbelow has a certain degree of resiliency which is directly dependent on the resiliency of the rubber particles comprising the aggregate. If a relatively resilient concrete is desired, the particles created by comminuting the waste rubber articles are coated with the cement as hereinbelow set forth without prior treatment. If a more rigid concrete is desired, the particles may be re-vulcanized to a harder state and then coated with cement. The less resilient particles result in a more rigid concrete. For example, if the rubber particles are re-vulcanized to a state of stone line hardness the resulting concrete will be light weight (3,000 to 5,000 psi) and stronger in compressive strength than conventional light weight concrete having shale aggregate.

In order to insure that the cement and the resilient particles are bonded together when water is added to the cement, and aggregate mixture and the mixture allowed to set, the particles formed from the comminuted articles are coated with a layer of the cement. In one embodiment the coating is accomplished by heating the resilient particles to depolymerize the material near the surface of the particles so that their outer surface becomes viscid. The temperature and length of time the particles must be heated until they reach this adhesive state are both functions of the type of rubber from which the particles are made. It has been determined that the rubber commonly found in discarded rubber tires must be heated to a temperature of between 300° to 450° F for approximately 2 to 10 minutes before the surfaces become adhesive. Once the surfaces of the resilient particles become viscid, the particles are mixed with cement. When the cement contacts the surfaces, it will adhere thereto enveloping each particle with a layer of cement. A suitable Blaine fineness for the cement to insure that the resilient particles are completely coated with the cement is from about 4000 cm$^2$/gm to about 6500 cm$^2$/gm. This cement coating will not separate from the particles when they are subsequently cooled since the cement is permanently bonded to the particles.

In an alternative embodiment the cement is heated to a temperature at which, when the heated cement is mixed with the resilient particles, the surfaces of the particles will become viscid and the cement will adhere thereto. The cement is permanently bonded to the particles and will not separate therefrom as the particles are cooled. It will be appreciated that the surfaces of the resilient particles may also be chemically treated to render them viscid.

In a further alternative embodiment a fine film of plastic is applied to the particles before they are coated with cement. The film may be applied by spraying or other conventional method. The plastic film aids in the adhesion of the cement to the particles. Plastics, such as parylene or epoxy have high tensile strengths (approximately 11,000 psi) and can be applied in layers as thin as 1 micron. After the particles are coated with the plastic film they are then coated with cement. The plastic coated particles may be coated as hereinabove described regarding the particles without the plastic coating, i.e. — by heating methods. Alternatively, the plastic coated particles may be coated with the cement before the plastic has set, i.e. — while the plastic coating is still viscid, immediately following its application to the particles.

In each of the above described methods of applying the cement coating to the particles, the cement may be injected or propelled into the particles by forced air. The result is that the cement will be forced into the viscid outer layer of the particles and trapped therein to further insure a strong bond between the cement and the resilient particles.

The coated resilient particles are then mixed with additional cement to form a cement and aggregate mixture. The uncoated particles are not mixed initially with the entire amount of cement required in the mixture because it has been found that a static charge is created through the mixture which repells water added to the mixture. It will be appreciated that if the static charge can be dissipated, the uncoated rubber particles can be coated and mixed with the full quantity of cement simultaneously. No additional aggregate such as crushed stone or gravel need be added. Preferably, the proportion of coated particles to cement is approximately 3 to 1 by volume or 2 to 1 by weight, but it is to be understood that these ratios are for means of illustration only, and are not to be viewed in a limiting sense.

As mentioned hereinabove, the resilient particles are completely encased by the cement. When water is added to the cement and aggregate mixture in an amount sufficient to cause the cement to set or gel irreversibly, the cement, and the cement coating the particles will bond as the aggregate sets resulting in the particles becoming an integral part of the concrete. If the cement is forced into the viscid surface of the particles as hereinabove mentioned, this bond is exceptionally strong. As a result, the concrete exhibits properties different from concrete having crushed stone, gravel, or sand aggregate. The presence of the resilient particles, being lighter than crushed stone, gravel, or sand, results in a lighter weight concrete. Further the resilient particles render the concrete shock resistant and resilient since the resilient particles will deform under pressure rendering the concrete less brittle than conventional concrete.

Further, since the resilient particles may be rubber, the concrete is scuff resistant and possesses electrical insulating and heat retention properties not unlike the rubber. In addition the concrete can handle large variations in temperature since the resilient particles will get harder at cooler temperatures and will get softer at higher temperatures.

The following examples illustrate the properties of a concrete formed from a cement aggregate in accordance with the present invention but it is to be understood that these examples are given by way of illustration and not by way of limitation.

EXAMPLE 1

A one ounce cylinder of concrete was formed from a cement aggregate of coated rubber particles and cement in a ratio of approximately 3 to 1 by volume of coated particles to cement. This cylinder had a dry weight of 1-7/16 ounces. A one ounce cylinder of concrete was formed from a cement aggregate of gravel mix and cement having a ratio of 3 to 1 by weight. This cylinder had a dry weight of 2-5/16 ounces.

Both cylinders were dropped from a height of 7 feet to a concrete floor. The cylinder formed of the gravel mix and cement aggregate failed after 48 drops. The cylinder formed from the coated rubber particles and cement aggregate was still intact after 250 drops.

EXAMPLE 2

The two cylinders formed in Example 1 were subjected to water absorption test. The results are set forth in the following table:

| | TIME OF SUBMISSION | | |
| --- | --- | --- | --- |
| | 30 mn[1] | 2 hr[1] | 3 hr[2] |
| Approximate weight gained by cylinder formed from coated rubber and cement aggregate | 1/16 oz. | none | ¼ oz. |
| Approximate weight gained by cylinder formed from gravel mix and cement aggretate | ½ oz. | none | 3/16 oz. |

[1]in cold water
[2]cylinder submerged in cold water for 2-½ hrs. and 30 min. in boiling water at approximately 230° F.

EXAMPLE 3

Both cylinders formed in Example 1 were submerged in cold water for 2½ hours and then placed in boiling water for 30 minutes at 230° F. Thereafter, they were removed and placed in room having ambient temperatures of 68° F for 30 minutes. The cylinder formed from the coated rubber particles and cement aggregate was 2° C warmer than the cylinder formed from the gravel mix and cement aggregate.

EXAMPLE 4

Cylinders formed according to the ratio in Example 1 but having a physical size of 6 inches diameter and 12 inches long were compression tested in conventional compression testing equipment. The cylinder formed from the coated rubber particle aggregate cracked at 10,600 pounds. It was then tested three additional times and in the last test registered a resistance of 7,000 pounds. In subsequent tests, the same cylinder withstood a force of 1,700 psi. The cylinder formed from the gravel mix and cement aggregate cracked at 85,000 pounds and in subsequent tests registered no resistance.

It has been found that the rubber particles in the concrete have a tendency to bleed or stain and thereby discolor the concrete. To prevent the rubber particles from bleeding, they may be coated with a thermoplastic or other fluid impervious film prior to being coated with cement. For example the plastic coating applied as hereinabove mentioned to aid in the adhesion of the cement to the particles, further acts as a fluid barrier so that fluid cannot contact the rubber and pick up impurities which will stain the concrete.

If a quick setting concrete is desired, sulphur can be added to the cement aggregate at a ratio of approximately 1% to 3% sulphur by weight to cement. Since the particles are formed from vulcanized rubber, some of the sulpur needed will be present in the rubber and will be released when the particles are heated in the cement coating process.

While the processes discussed above deal with particles formed from vulcanized rubber, the particles may be formed from unvulcanized rubber. After the particles are formed, they are then combined with sulphur and heated to the vulcanization temperature. As the particles are cooled after vulcanization, they may be coated with cement at a point when their outer surfaces are viscid in the manner hereinabove described.

It will be appreciated by those skilled in the art that the objects of the present invention have been achieved by a process of coating comminuted resilient particles with cement.

The particles may be heated to a temperature at which their outer surface becomes viscid. The particles are then mixed with cement which will adhere to the viscid surfaces, completely enveloping each particle in a layer of cement. In an alternative embodiment, the cement may be heated and the particles mixed therewith with the same result. The cement will adhere to the viscid outer surfaces of the particles. When the particles cool, the cement will be permanently bonded to the particles. In a further alternative embodiment, the particles may be first coated with a film of plastic before being coated with cement. The coated particles are then mixed with additional cement to form a cement and aggregate mixture.

Then water is added to the cement and aggregate mixture in an amount sufficient to cause the cement to set or gel irreversibly the cement in the mixture and the cement in the coating will bond as the mixture sets resulting in the particles becoming an integral part of the concrete. As a result, the concrete exhibits properties different from concrete having a crushed stone or gravel aggregate.

The plastic film applied to the particles acts as a fluid barrier to prevent the rubber particles from staining the concrete.

What is claimed is:

1. A method for producing a cement and aggregate mixture which comprises the steps of:
   a. treating particles of rubber so that the outer surface of said particles becomes viscid;
   b. mixing said treated particles with dry cement so that said cement is permanently bonded to said particles through adhesion to said viscid outer surfaces to form a cement coated aggregate; and
   c. adding said cement coated aggregate to an additional quantity of cement to create a cement and aggregated mixture having a predetermined ratio of cement coated aggregate to cement by weight.

2. The method in accordance with claim 1 wherein said step of treating said particles comprises heating said particles until the outer surfaces of said particles become viscid, said dry cement adhering to said viscid outer surfaces when it is mixed with said particles.

3. The method in accordance with claim 1 further including the step of comminuting waste articles of rubber to reduce said waste articles to said particles prior to their being treated.

4. The method in accordance with claim 2 further including a preliminary step of revulcanizing said particles to thereby harden said particles and reduce their resiliency.

5. A method for producing a cement and aggregate mixture which comprises the steps of:
   a. heating a dry cement,
   b. mixing particles of rubber with said dry cement, said dry cement being heated to a temperature at which, when said particles are mixed therewith, the outer surfaces of said particles become viscid and said dry cement is permanetly bonded to said particles through adhesion to said viscid outer surfaces to form a cement coated aggregate;
   c. adding said cement coated aggregate to an additional quantity of cement to create an cement and aggregate mixture having a predetermined ratio of cement coated aggregate to cement by weight.

6. The method in accordance with claim 5 further including the step of comminuting waste articles of rubber to reduce said waste articles to said particles prior to their being treated.

7. The method in accordance with claim 6 further including the step of revulcanizing said small particles to thereby harden said particles and reduce their resiliency.

8. The method in accordance with claim 6 wherein said waste articles are discarded rubber tires.

9. A method for producing a cement and aggregate mixture which comprises the steps of:
   a. coating particles of rubber with a film of plastic;
   b. treating said plastic coated particles of rubber so that the outer surface of said plastic film becomes viscid;
   c. mixing said treated plastic coated particles with dry cement so that said cement is permanently bonded to said particles through adhesion to said viscid outer surfaces of said plastic film to form a cement coated aggregate; and
   d. adding said cement coated aggregate to an additional quantity of cement to create a cement and aggregate mixture having a predetermined ratio of cement coated aggregate to cement by weight.

10. The method in accordance with claim 9 wherein said step of treating said plastic coated particles comprises heating said particles until the outer surface of said plastic film becomes viscid, said dry cement adhering to said viscid outer surfaces when it is mixed with said particles.

11. The method in accordance with claim 9 further including the step of comminuting waste articles of rubber to reduce said waste articles to said particles prior to their being coated with said plastic film.

12. The method in accordance with claim 9 further including the step of revulcanizing said small particles to thereby harden said particles and reduce their resiliency.

13. The method in accordance with claim 11 wherein said waste articles are discarded rubber tires.

14. A method for producing a cement and aggregate mixture which comprises the steps of:
   a. heating a dry cement;
   b. coating particles of rubber with a film of plastic;
   c. mixing said plastic coated particles with said dry cement, said dry cement being heated to a temperature at which, when said plastic coated particles are mixed therewith, the outer surface of said plastic film becomes viscid and said dry cement is permanently bonded to said particles through adhesion to said viscid outer surfaces of said plastic film to form a cement coated aggregate;
   d. adding said cement coated aggregate to an additional quantity of cement to create a cement and aggregate mixture having a predetermined ratio of cement coated aggregate to cement by weight.

15. The method in accordance with claim 14 further including the step of comminuting waste articles of rubber to reduce said waste articles to said particles prior to their being coated with said plastic film.

16. The method in accordance with claim 14 further including the step of revulcanizing said small particles to thereby harden said particles and reduce their resiliency.

17. The method in accordance with claim 15 wherein said waste articles are discarded rubber tires.

18. A cement and aggregate mixture comprising:
   a. a multiplicity of particles of rubber
   b. a coating of dry cement permanently bonded to said particles, said cement coated particles forming an aggregate and;
   c. dry cement, said cement coated aggregate being dispersed with said dry cement to form a cement and aggregate mixture having a predetermined ratio of particles to cement by volume.

19. The method in accordance with claim 3 wherein said waste articles are discarbed rubber tires.

20. The method in accordance with claim 2 wherein the particles are heated to a temperature of 300° to 450° F for a period of between 2 to 10 minutes.

21. The method in accordance with claim 1 wherein said step of mixing said particles with cement includes injecting said cement into said outer layer of said particles so that it is firmly bonded thereto.

22. The cement and aggregate mixture in accordance with claim 18 wherein said ratio of particles to cement is 3:1 by volume.

23. The cement and aggregate mixture in accordance with claim 18 further including a coating of a material intermediate said particles and said coating of cement, said coating of cement being permanently bonded to said coating of material, said material preventing fluid from contacting and absorbing impurities from said particles.

24. The cement and aggregate mixture in accordance with claim 23 wherein said material is a plastic.

25. The cement and aggregate mixture in accordance with claim 18 wherein said resilient material is rubber.

26. The cement and aggregate mixture in accordance with claim 18 wherein said multiplicity of particles have a size of between about 20 to about 60 mesh size.

27. The cement and aggregate mixture in accordance with claim 18 wherein said cement has a Blaine fineness of between approximately 4,000 $cm^2/gm$ and 6,500 $cm^2/gm$.

* * * * *

UNITED STATES PATENT AND TRADEMARK OFFICE
CERTIFICATE OF CORRECTION

PATENT NO. : 4,035,192

DATED : July 12, 1977

INVENTOR(S) : JOSEPH P. BUSACCA

It is certified that error appears in the above-identified patent and that said Letters Patent are hereby corrected as shown below:

Col. 1 line 33, read "2,623,914" instead of "2,263,914".

Signed and Sealed this

Ninth Day of May 1978

[SEAL]

Attest:

RUTH C. MASON
Attesting Officer

LUTRELLE F. PARKER
Acting Commissioner of Patents and Trademarks